US011667262B2

United States Patent
Ots et al.

(10) Patent No.: US 11,667,262 B2
(45) Date of Patent: Jun. 6, 2023

(54) SEAT BELT BUCKLE SYSTEM

(71) Applicant: Autoliv Development AB, Vargarda (SE)

(72) Inventors: Aidu Ots, Saue Sity (EE); Larissa Melnikova, Tallinn (EE); Ole Scharnberg, Hamburg (DE); Stephan Ruchhoeft, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 16/755,200

(22) PCT Filed: Oct. 8, 2018

(86) PCT No.: PCT/EP2018/077287
§ 371 (c)(1),
(2) Date: Apr. 10, 2020

(87) PCT Pub. No.: WO2019/072748
PCT Pub. Date: Apr. 18, 2019

(65) Prior Publication Data
US 2020/0254966 A1    Aug. 13, 2020

(30) Foreign Application Priority Data
Oct. 11, 2017  (DE) .................. 102017123640.6

(51) Int. Cl.
*B60R 22/48*   (2006.01)
(52) U.S. Cl.
CPC ...... *B60R 22/48* (2013.01); *B60R 2022/4816* (2013.01)

(58) Field of Classification Search
CPC ...... B60R 2022/4816; B60R 21/01546; B64D 11/06; B64D 45/0056; B64D 11/062
See application file for complete search history.

(56) References Cited

U.S. PATENT DOCUMENTS

| | | | |
|---|---|---|---|
| 10,315,620 B1* | 6/2019 | Morgantini | ............ B60N 2/002 |
| 2007/0096891 A1* | 5/2007 | Sheriff | .............. B60R 21/01556 |
| | | | 340/457.1 |
| 2007/0139185 A1* | 6/2007 | Nathan | ................ B60N 2/0244 |
| | | | 340/538 |

(Continued)

FOREIGN PATENT DOCUMENTS

| | | | | |
|---|---|---|---|---|
| EP | 2 189 372 A1 | 5/2010 | | |
| EP | 2189372 A1 * | 5/2010 | ........... B64D 11/062 |

(Continued)

OTHER PUBLICATIONS

International Search Report of the International Searching Authority for PCT/EP2018/077287 dated Dec. 17, 2018.

(Continued)

*Primary Examiner* — Mirza F Alam
(74) *Attorney, Agent, or Firm* — Dickinson Wright PLLC

(57) ABSTRACT

A seat belt buckle (1) and a belt tongue (2) which can be inserted into the seat belt buckle (1). An RFID responder (3) is arranged in or on the belt tongue (2) and an RFID reading unit (4) is arranged in the seat belt buckle (1) and is designed in such a way that a coupling between the RFID reading unit (4) and the RFID transponder (3) is only possible if the belt tongue (2) is inserted into the seat belt buckle (1).

11 Claims, 4 Drawing Sheets

(56) References Cited

U.S. PATENT DOCUMENTS

| | | | |
|---|---|---|---|
| 2007/0221428 A1* | 9/2007 | Strutz | B60R 22/48 180/268 |
| 2009/0015394 A1 | 1/2009 | Specht et al. | |
| 2009/0146789 A1* | 6/2009 | Holbein | B60R 22/48 340/10.1 |

FOREIGN PATENT DOCUMENTS

| | | | |
|---|---|---|---|
| WO | 98/29283 | A1 | 7/1998 |
| WO | 2009/008949 | A1 | 1/2009 |

OTHER PUBLICATIONS

English Translation of International Search Report of the International Searching Authority for PCT/EP2018/077287 dated Dec. 17, 2018.

* cited by examiner

SEAT BELT BUCKLE SYSTEM

CROSS-REFERENCE TO RELATED APPLICATIONS

This application is a 35 U.S.C. § 371 national phase of PCT International Application No. PCT/EP2018/077287, filed Oct. 8, 2018, which claims the benefit of priority under 35 U.S.C. § 119 to German Patent Application No. 10 2017 123 640.6, filed Oct. 11, 2017, the contents of which are incorporated herein by reference in their entirety.

FIELD OF THE INVENTION

The invention relates to a seat belt buckle system which comprises a seat belt buckle and a belt tongue which can be inserted into the seat belt buckle.

It is known that a switch is arranged in the seat belt buckle, by means of which switch the insertion of a belt tongue into the seat belt buckle can be detected. Due to this switch, it is possible for the driver to receive an optical and/or acoustic warning when he is not buckled. It has been found that some drivers insert a fake tongue or the belt tongue of the passenger into the seat belt buckle in order to avoid the warning. Such behavior is very dangerous. In addition, the signal of the buckle switch is frequently used for detecting that a person is present on the driver's seat, whereby certain functions of the vehicle may be activated. Therefore, there is a need for a warning to also be issued if a belt tongue not assigned to the seat belt buckle is inserted into the seat belt buckle.

BACKGROUND

DE 10 2006 055 141 A1 discloses a seat belt buckle system with a switch in the seat belt buckle. The buckle switch is connected to an RF identification tag, whose emittable identification signal is changed on the basis of the switching state of the buckle switch, such that the state of the seat belt buckle can be transmitted wirelessly to the vehicle control system via the RF identification tag. However, the use of such an RF identification tag in combination with a buckle switch does not preclude a belt tongue actually not associated with the seat belt buckle from being used to change the state detected by the RF identification tag.

The object of the present invention is therefore to eliminate the disadvantages described with reference to the prior art and to in particular specify a seat belt buckle system which reliably recognizes that the belt tongue assigned to the seat belt buckle is inserted into the seat belt buckle.

SUMMARY

The object is achieved by a seat belt buckle system with the features of the independent claim. Advantageous developments of the seat belt buckle system are specified in the dependent claims and in the description, wherein individual features of the advantageous developments can be combined with one another as desired in a technically sensible manner.

The object is achieved in particular by a seat belt buckle system having the aforementioned features, with which an RFID transponder is arranged in or on the belt tongue and an RFID reading unit is arranged in the seat belt buckle and is designed in such a way that a coupling between the RFID reading unit and the RFID transponder is only possible if the belt tongue is inserted into the seat belt buckle.

Since a code identifying the respective belt tongue can be stored on the RFID transponder and such code can be read out wirelessly by the RFID reading unit, it can be ensured that only the belt tongue associated with the corresponding seat belt buckle is identified as such in the inserted state. RFID technology as such is sufficiently known. The RFID transponder, which is also referred to as a tag or a chip, is activated and supplied with energy via an electromagnetic field generated by the RFID reading unit. After activation, the transponder sends the information stored thereon to the reading device. Near-field communication (NFC) is a subgroup of RFID technology, wherein a transmission standard is defined by near-field communication.

In order to ensure that a coupling between the transponder and the reading unit cannot also take place if the belt tongue is not inserted into the seat belt buckle and is only arranged outside the seat belt buckle, different measures can be taken.

For example, the RFID transponder can be arranged in or on a section of the belt tongue which can be inserted into the seat belt buckle. In the inserted and in particular also locked state, the RFID transponder is thus arranged directly in the seat belt buckle and in particular is arranged at a very short distance from the reading unit of the seat belt buckle. In the inserted or locked state, this distance is, for example, not more than 3 cm (centimeters), preferably not more than 1 cm, and particularly preferably not more than 0.5 cm.

Such an arrangement can be achieved, for example, by arranging the RFID transponder in or on a metal plate of the belt tongue. As a rule, belt tongues have a metal plate body, whose region arranged outside the seat belt buckle in the buckled state is surrounded by a plastic overmold.

The RFID transponder can be arranged in a recess, for example in the manner of a blind hole, that does not completely go through the plate. Thus, it is also ensured that radiation emitted by the RFID transponder is directed in the direction of the opening of the recess or of the blind hole. In contrast, the radiation cannot travel in the opposite direction (through the metal), at least not without being attenuated.

In this way, it can also be ensured that a coupling between the RFID transponder and the RFID reading unit can only take place if the belt tongue is inserted into the seat belt buckle with a predetermined orientation, in particular if the RFID transponder arranged on one side of the plate faces the RFID reading unit arranged in the seat belt buckle.

In order to ensure that the RFID transponder is also arranged within the seat belt buckle in the buckled state, the RFID transponder can be arranged in or on a section of the plastic overmold of the belt tongue, wherein the section extends into the seat belt buckle in the inserted state of the belt tongue. The RFID transponder can be embedded into the section of the overmold, but can also be applied, for example adhesively bonded, to the corresponding section of the overmold.

In order to simplify the assembly of the belt tongue, it can be provided that the RFID transponder is arranged in a plastic housing for mounting (in particular for pre-fastening) to a metal plate of the belt tongue and for spacing from the plate.

In particular for pre-fastening the housing carrying the RFID transponder, it can be provided that the housing can be fastened in a force-fitting and/or positive-locking manner to the plate, in particular by means of a latching connection. For this purpose, the housing can have, for example, latching hooks which are inserted through a through-hole in the plate and which, in the inserted state, (pre-)fasten the housing and thus also the RFID transponder in their position.

In addition, it can be provided that the housing initially pre-fastened to the plate is at least partially surrounded by a plastic overmold of the belt tongue. The housing and thus the RFID transponder can be fastened captively to the plate by the at least partial overmolding of the housing. In this connection, it is particularly preferred if, in order to avoid stresses, the plastic of the housing and the plastic of the overmold consist of the same material.

With the use of a plastic housing, an electrically conductive connection between the RFID transponder and the plate can thus be prevented initially, while the RFID transponder can be (pre-)fastened to the plate at the same time. Accordingly, a method for producing a belt tongue is however also proposed, with which a plastic housing having an RFID transponder is initially pre-fastened in a positive-locking and/or force-fitting manner to a metal plate and is subsequently at least partially overmolded by an overmold that is also plastic.

In order to ensure that a coupling between the RFID transponder and the RFID reading unit can only take place when the belt tongue is inserted into the seat belt buckle, it can be provided that the maximum transmission power of the RFID reading unit is so low that a coupling with the RFID transponder is only possible if the distance between the RFID transponder and the RFID reading unit is less than 3 cm, preferably less than 1 cm, very particularly preferably less than 0.5 cm.

However, preventing a coupling when the belt tongue is not inserted can also be achieved by structural measures on the seat belt buckle. The seat belt buckle can thus be designed in such a way that the radiation emitted by the RFID reading unit or the RFID transponder is at least attenuated in at least one direction, such that a coupling between the RFID transponder and RFID reading unit is not possible when the belt tongue is held on the seat belt buckle from the outside. For example, the RFID reading unit can be designed with its emission characteristic and/or the RFID transponder can be designed with its emission characteristic in such a way that a coupling is only possible if the belt tongue is inserted into the seat belt buckle. In this case, it would even be conceivable for the RFID transponder to be arranged in a region of the belt tongue which is arranged outside the seat belt buckle when the belt tongue is inserted.

Such structural measures can be achieved in particular by at least one shielding plate arranged in the seat belt buckle. However, such shielding can also be effected by corresponding arrangement of the sheet metal parts normally located in a seat belt buckle.

If the identification of the belt tongue assigned to the seat belt buckle is not only possible via the RFID reading unit, but if it can also be determined by means of the RFID reading unit, due to the design of the seat belt buckle and the belt tongue, that the belt tongue is inserted into the seat belt buckle, an additional switch or sensor for detecting the belt tongue inserted into the seat belt buckle can be dispensed with.

So that the RFID reading unit can easily replace a conventional switch, it is configured in such a way that the RFID reading unit outputs a discrete signal, for example a current of a few milliamperes, when coupled with the RFID transponder. In the uncoupled state, however, the RFID reading unit outputs a different discrete signal.

Alternatively, however, it can also be provided that the RFID reading unit can be connected to a vehicle BUS system.

BRIEF DESCRIPTION OF THE DRAWINGS

The invention and the technical environment are explained below by way of example with reference to the figures. The following are shown schematically.

DETAILED DESCRIPTION

Figure 1:
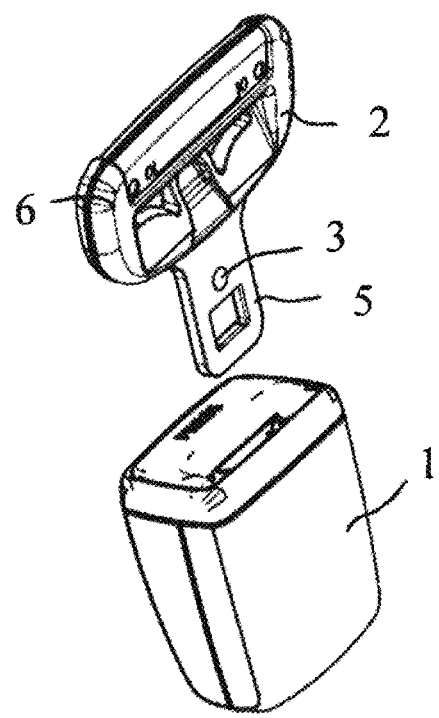
FIG. 1: a seat belt buckle system in the unbuckled state.
Figure 2:
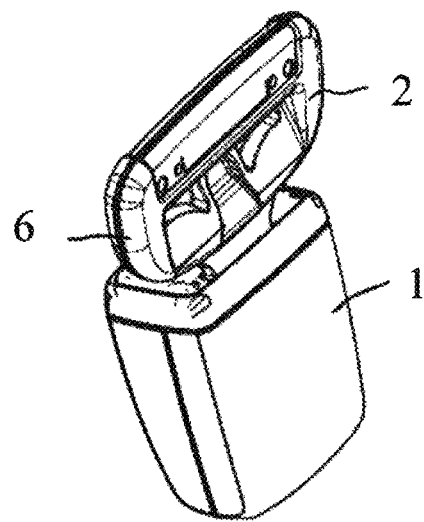
FIG. 2: the seat belt buckle system in the buckled state with a belt tongue inserted into the seat belt buckle.

The seat belt buckle system shown in FIGS. 1 to 3 and 5 and 6 comprises a seat belt buckle 1 and a belt tongue 2. The belt tongue 2 has a metal plate 5 and a plastic overmold 6 which partially surrounds the plate 5. A blind hole in which an RFID transponder 3 is fastened is formed in the section of the plate 5 inserted into the seat belt buckle 1 in the buckled state.

Figure 3:
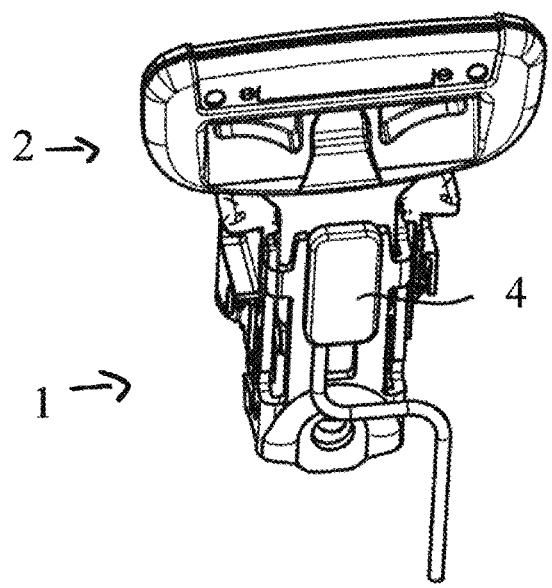
FIG. 3: the seat belt buckle system in the buckled state without a housing of the seat belt buckle.
Figure 5:
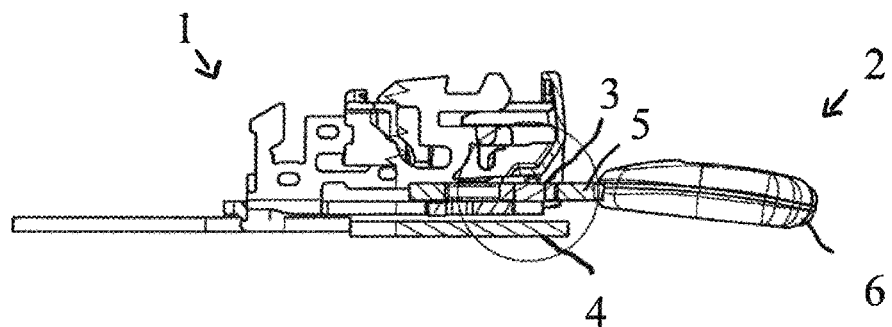
FIG. 5: a partial cross-sectional view through a seat belt buckle when the belt tongue is inserted.
Figure 6:
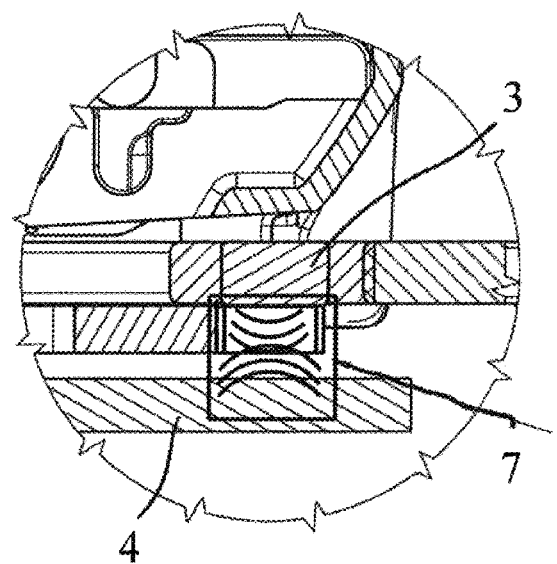
FIG. 6: a detailed view of the illustration of FIG. 5, FIG. 7: a plate of a belt tongue before assembly with a housing having an RFID transponder.

In FIGS. 3, 5 and 6, the seat belt buckle system is shown in the inserted state of the belt tongue 2, wherein the belt tongue 2 is locked in the seat belt buckle 1. However, the housing of the seat belt buckle 1 is not shown. It can be seen that an RFID reading unit 4 is arranged in the seat belt buckle 1. The RFID transponder 3 arranged in the blind hole in the plate 5 is arranged on the side of the plate 5 facing the RFID reading unit 4 (see FIGS. 5 and 6). Due to the low transmission power of the RFID reading unit 4 and the short distance to the RFID transponder 3 in the inserted state, coupling between the two can only take place if the belt tongue 2 is inserted into the seat belt buckle 1 with the correct orientation and the RFID transponder 3 and the RFID reading unit 4 are located relative to one another in a coupling region 7. Since an identification number identifying the belt tongue 2 is stored on the RFID transponder 3, the RFID reading unit 4 can determine whether the belt tongue 2 assigned to the seat belt buckle 1 is inserted into the seat belt buckle 1. Since a coupling is only possible in the orientation shown of the belt tongue 2, an electromagnetic coupling between the RFID transponder 3 and the RFID reading unit 4 can also only take place if the belt tongue 2 is inserted into the seat belt buckle 1 with the correct orientation.

Figure 4:
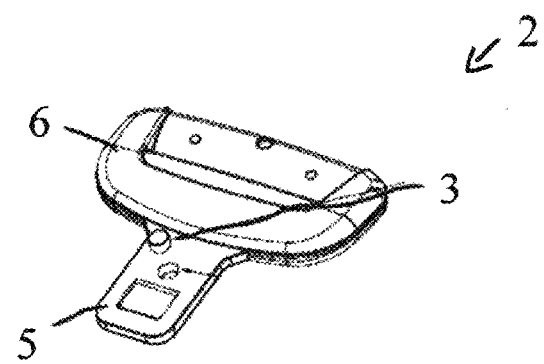
FIG. 4: a further embodiment of a belt tongue.

FIG. 4 shows an alternative embodiment of the belt tongue 2, with which the RFID transponder 2 is arranged on the plate 5.

Figure 7:
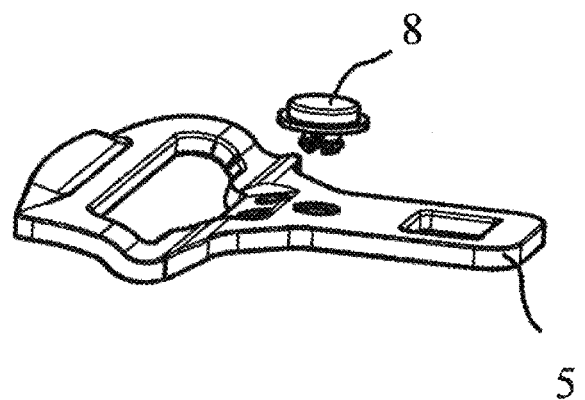
Figure 8:
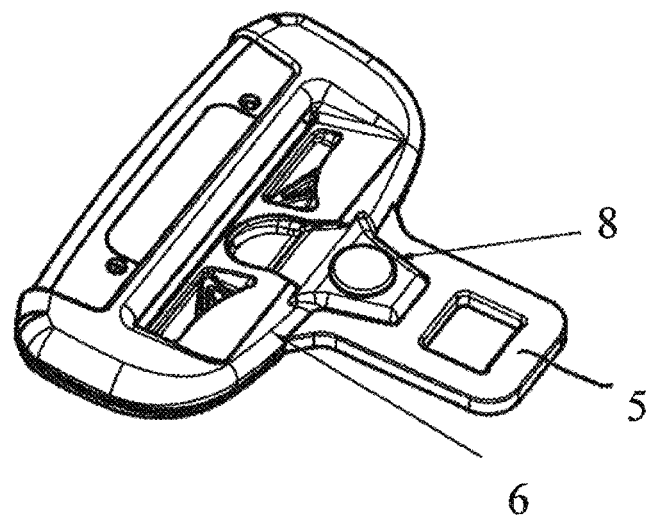
FIG. 8: the belt tongue comprising the plate and RFID transponder according to FIG. 7.

FIG. 7 shows a plate of a belt tongue and a housing 8. An RFID transponder is integrated into the housing 8. The housing 8 has latching hooks which can be inserted into a through-hole in the plate 5 for a positive-locking connection to the plate 5.

After the housing 8 is pre-fastened to the plate 5 by latching in the plate 5, a plastic overmold 6 is formed, wherein the overmold 6 at least partially surrounds the housing 8 and thus finally fastens the housing 8 and the RFID transponder arranged therein to the plate 5.

While the above description constitutes the preferred embodiment of the present invention, it will be appreciated that the invention is susceptible to modification, variation and change without departing from the proper scope and fair meaning of the accompanying claims.

The invention claimed is:

1. A seat belt buckle system comprising, a seat belt buckle and a belt tongue inserted into the seat belt buckle in an inserted state, wherein an RFID transponder is arranged in or on the belt tongue and an RFID reading unit is arranged in the seat belt buckle, wherein the RFID transponder is arranged inside a blind hole with an opening formed in a metal plate of the belt tongue, and wherein radiation emitted by the RFID transponder is directed to the opening of the blind hole faced to the RFID reading unit of the seat belt buckle defined as a predetermined orientation of the belt tongue such that the RFID reading unit and the RFID transponder are coupled when the belt tongue is inserted into the seatbelt buckle in the predetermined orientation, and wherein the coupling between the RFID reading unit and the RFID transponder is possible at a distance between the RFID reading unit and the RFID transponder of up to 3 cm.

2. The seat belt buckle system according to claim 1, wherein the RFID transponder is arranged in or on a section of the belt tongue which can be inserted into the seat belt buckle in the inserted state.

3. The seat belt buckle system according to claim 2, wherein the RFID transponder is arranged in or on a section of a plastic overmold of the belt tongue which, in the inserted state, extends into the seat belt buckle.

4. A seat belt buckle system comprising, a seat belt buckle and a belt tongue inserted into the seat belt buckle in an inserted state, wherein an RFID transponder is arranged in or on the belt tongue and an RFID reading unit is arranged in the seat belt buckle, and the RFID reading unit and the RFID transponder coupled when the belt tongue is inserted into the seat belt buckle in a single orientation, wherein the RFID transponder is embedded in a separate plastic housing formed with a latching connection such that the plastic housing having the RFID transponder is connected to a metal plate of the belt tongue in a force-fitting or a positive-locking manner, and wherein the plastic housing having the RFID transponder is mounted to the metal plate of the belt tongue and the RFID transponder is spaced apart from the metal plate, and wherein the coupling between the RFID reading unit and the RFID transponder is possible at a distance between the RFID reading unit and the RFID transponder of up to 3 cm.

5. The seat belt buckle system according to claim 4, wherein the plastic housing is at least partially overmolded by a plastic overmold of the belt tongue.

6. The seat belt buckle system according to claim 1, wherein the seat belt buckle is designed in such a way that the radiation emitted by the RFID transponder is at least attenuated in at least one direction so that a coupling between the RFID transponder and the RFID reading unit is not possible when the belt tongue is not in the inserted state in the predetermined orientation.

7. The seat belt buckle system according to claim 6, wherein at least one shielding plate is arranged in the seat belt buckle.

8. The seat belt buckle system according to claim 1, wherein the RFID reading unit outputs a discrete signal when coupled with the RFID transponder.

9. The seat belt buckle system according to claim 1, wherein the RFID reading unit is connected to a vehicle BUS system.

10. The seat belt buckle system according to claim 1, wherein no additional switch or sensor is provided for detecting the belt tongue inserted into the seat belt buckle.

11. The seat belt buckle system according to claim 4, wherein the separate plastic housing is configured for spacing the RFID transponder apart from the metal plate.

* * * * *